Nov. 29, 1927.   W. D. BURTON   1,650,603
TENSION METER
Filed June 9, 1923   2 Sheets-Sheet 1
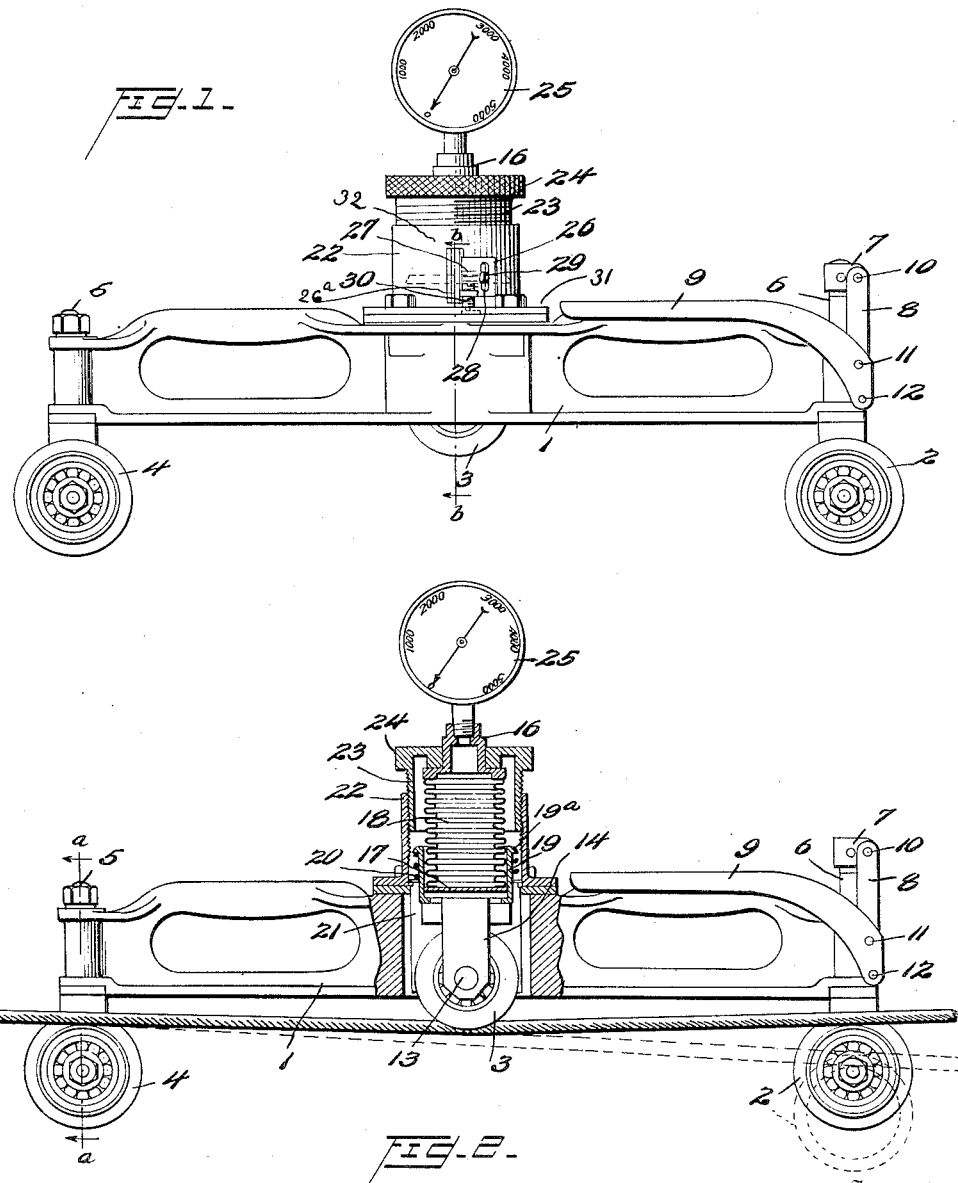

Nov. 29, 1927.                    1,650,603
W. D. BURTON
TENSION METER
Filed June 9, 1923          2 Sheets-Sheet 2
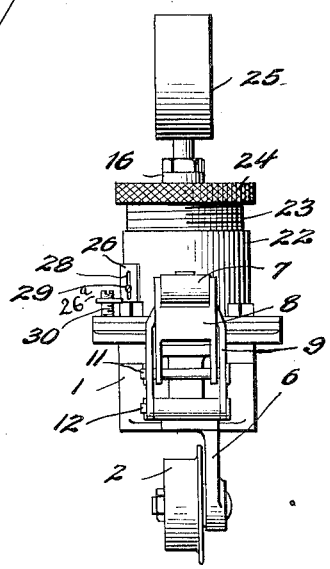
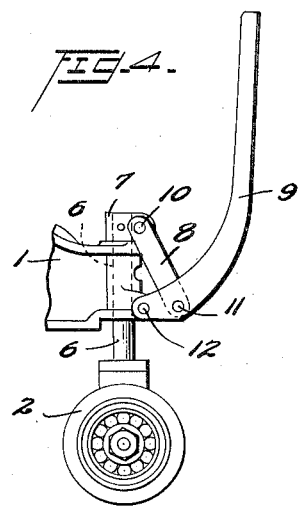
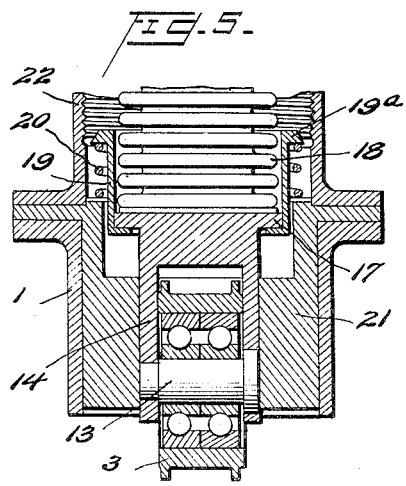
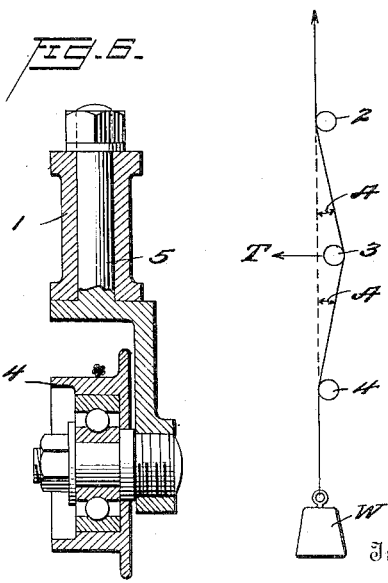

Patented Nov. 29, 1927.

1,650,603

UNITED STATES PATENT OFFICE.

WARREN DEAN BURTON, OF DAYTON, OHIO.

TENSION METER.

Application filed June 9, 1923. Serial No. 644,486.

This invention relates in general to tension meters and more particularly to a device for readily ascertaining the tension on a cable or rope such as a cable holding an observation balloon or a cable supporting a car on an airship. This instrument is also applicable to use in ascertaining the tension on any other kind of tension cable or the like.

It is an object of my invention to provide an instrument of the kind described above which is capable of being quickly applied or removed and which is also light in weight so as to provide for easy transportation.

Another object of my invention is to provide means for immediately indicating any variation in tension without the necessity of adjustment when the load is changed.

Other objects of my invention will appear in the accompanying specification and claims and will be disclosed in the drawings in which—

Figure 1 is a side elevation showing the tension meter assembly;

Figure 2 is a side elevation showing the tension meter assembly partly in cross section and indicating the two positions of the movable pulley;

Figure 3 is an end view of my assembly;

Figure 4 is a side elevation of the right hand end of the device as shown in Figure 1 but with the toggle hand clamp raised;

Figure 5 is a cross section on the line b—b of Figure 1;

Figure 6 is a cross section on the line a—a of Figure 2.

Figure 7 is a diagrammatic view illustrating the principle involved in this meter.

Referring with greater particularity to the drawings, my device may be seen to be comprised as follows:

A spider frame 1 is adapted to support the three pulleys 2, 3 and 4. The pulleys 2 and 4 are single flanged pulleys and are adapted to be mounted at the ends of the spider 1. The pulley 4 is mounted on a suitable stud fixed on the arm 5 while the pulley 2 is adapted to be mounted on a stud on the bracket 6 which is provided with a portion adapted to have a sliding fit in a bore at the end of the frame 1. The bracket 6 is provided with a collar 7 to which a link arm 8 is adapted to be pivotally connected at 10. The toggle arm 9 pivotally secured to the frame 1 at 12 and to the link arm 8 at 11 is provided to raise or lower the pulley bracket 6 into the two positions shown in Figures 1 and 4. The pulley 3 is mounted on a shaft 13 secured in a fork 14 which fork terminates in a flanged portion 17 adapted to bear against the base of a fluid filled bellows 18. A sleeve 19 has an inside flange portion adapted to fit under the lower edge of the disk 17 and it is provided near its upper end with an outside flange 19ª, said flange being bevelled as shown in Figs. 1 and 2. A compression spring 20 is adapted to be mounted between the outer flange 19ª of the sleeve 19 and the guide 21 to hold the sleeve 19 together with flanged portion 17, against the base of the bellows 18, when the meter is not in use. The guide 21 permits longitudinal movement of the fork 14 but prevents any lateral motion thereof. The guide 21 with the sleeve 22 is firmly secured to the frame 1.

At 23 there is shown a cap provided with a suitable thread for screw threadedly engaging sleeve 22. This cap is provided with a knurled rim 24 and is adapted to act as a guide means for a portion of the head 16 of the collapsible tube 18 into which head the stem of a pressure gage 25 which may be of any suitable design is tightly screwed.

Referring more particularly to Figure 1 it will be seen that I have provided a plate 26 with suitable graduations 27. This plate is adjustably mounted on the sleeve 22 by means of a screw 29 passing through a slot 28 in the plate 26. The plate 26 is provided at the lower end with a lug 26ª threaded to receive the screw 30, which bears against the flange 31 at the base of the sleeve 22. The screw 30 is for calibrating the meter and is not to be moved once the meter is adjusted. An opening 32 in the side of the sleeve 22 is located adjacent the graduation on plate 26 and provides a suitable setting of the flange 19ª with respect to the graduations on plate 26 for a purpose to be described hereinafter.

Referring to Figure 2 it will be seen that I have provided the collapsible fluid tube 18 which is adapted to be filled with some non-freezing liquid such as oil or glycerine. In filling this tube all air must be carefully excluded. As liquid is practically non-compressible any force tending to collapse the tube 18 will simply result in an increased liquid pressure. Thus, if a force is applied against the lower head of the tube a liquid pressure will result in direct proportion to this thrust and this pressure will be indicated by the gauge 25. The non-compressibility of the liquid will prevent any motion of the fork 14, due to any variation of the thrust. A very slight motion in reality does occur, however, between minimum and maximum loads due to the very slight displacement of liquid within the gauge tube. This motion is so slight, however, that the error of an indicated pressure is negligible.

The gauge dial can be graduated so as to give a direct reading of the cable tension. If a special dial is not used, however, a conversion table can be provided giving the equivalent cable tensions to gauge pressure. The method of operating the instrument is as follows:

First the diameter of the cable is ascertained. Then the cap 23 is screwed either in or out until the sharp flange edge on the sleeve 19 coincides with the cable size graduated on the scale 27. Thus if the cable is ¼th inch in diameter the flange 19 must coincide with the same graduation in the scale plate 26. It will be noted that my tension meter is very easily applied to the cable to be tested since the pulleys 2 and 4 have but single flanges. Once the cable is placed in position and its diameter measured a simple movement of the toggle lever 9 from the position shown in Figure 4 to the position shown in Figure 1 will raise the pulley 2 to such a position as to apply the load from the tension on the pulley 3. This permits three pulleys being placed over a straight cable with none of the flanges interfering. The tension of the cable will transmit its load on the pulley 3 compressing the fluid in the fluid bellows 18 and giving a direct reading on the indicator 25.

In Figure 7 I have illustrated a diagram showing the principle upon which this tension meter is based. In this case we have a cable firmly secured at its upper end and supporting the weight W. When the tension meter is placed upon the cable the middle pulley 3 causes the cable to be bent forming the two angles A. There will be a thrust T in the direction of the arrow in direct proportion to the weight W, the angles remaining constant. In my tension meter I have provided means for measuring this thrust T.

I claim:

1. A manual tension meter for testing cable and the like, a frame provided with three pulleys, one of said pulleys being fixedly mounted on said frame, means for moving one of said pulleys vertically in said frame comprising a movable bracket, a fluid filled bellows having a base, a flanged support, spring means coacting with said support in said frame to cause the same to bear against said base and adapted to support the third of said pulleys, tension indicating means adapted to be operated by the pressure in said bellows, and toggle means adapted to move said second pulley towards said frame to place said third pulley under load from the cable tension.

2. A manual tension meter for testing cable and the like of different size, a frame provided with three pulleys, one of said pulleys being fixedly mounted on said frame, means comprising a movable bracket for moving the second of said pulleys up and down and the third of said pulleys having a mounting positioned against a yieldable support including a flange held in position by a compression spring and adapted to bear against a fluid filled bellows, tension indicating means adapted to be operated by the pressure in said bellows, and toggle means adapted to move said movably mounted pulley toward said frame to place said third pulley under load from the cable tension.

3. A manual tension meter for measuring the tension of cables of different diameters, comprising in combination, a frame provided with two pulleys, a housing on said frame, a third pulley yieldingly supported in said housing, adjusting means in said housing to adjust said meter to correctly compensate for variations in cable diameters and indicating means on said housing to give indications of the setting of said meter for said cable diameter.

4. A manual tension meter for measuring the tension of cables of different diameters, comprising in combination, a frame, three pulleys mounted thereon, one of said pulleys being fixedly mounted on one end of said frame, one of said pulleys being mounted on a bracket for transverse movement relative to said frame, a housing, an opening formed in said housing, a graduated scale on said housing and adjacent said opening formed therein, a pulley intermediate said first-mentioned pulleys, said last named pulley being mounted in said housing for transverse movement, relative thereto, a fluid filled bellows supporting said last named pulley and indicating means transposed between said bellows and said last named pulley co-acting with said graduated scale to calibrate said meter for proper cable sizes.

5. In a manual device for measuring the tension of a cable or the like, in combination, a frame, a pulley mounted on a fixed stud at one end of said frame, a bracket mounted in the other end of said frame and slidable transversely thereof, a pulley mounted in said bracket, a fluid filled bellows, a third pulley intermediate of said first two named pulleys, and mounted on a support including a flange held in position by a compression spring, said support being adapted to bear against a fluid filled bellows, and means adapted to operate said slidable bracket to bring said second named pulley into proximity to the frame and place said third named pulley under load from the tension of the cable, and indicating means adapted to indicate the tension of said cable or the like.

6. In a manual device for measuring the tension of a cable or the like, in combination, a frame, a pulley mounted on a fixed stud at one end of said frame, a bracket mounted in the other end of said frame and slidable transversely thereof, a pulley mounted in said bracket, a fluid filled bellows, a third pulley intermediate of said first two named pulleys, and mounted on a support including a flange held in position by a compression spring, said support being adapted to bear against a fluid filled bellows, and toggle means adapted to operate said slidable bracket to bring said second named pulley into proximity to the frame and place said third named pulley under load from the tension of the cable, and indicating means adapted to indicate the tension of said cable or the like.

7. A manual device for measuring the tension of a cable or the like of different diameters, in combination, a frame, a pulley mounted on a fixed stud at one end of said frame, a bracket mounted in the other end of said frame and slidable transversely thereof, a pulley mounted in said bracket, a fluid filled bellows, a third pulley mounted on a support intermediate of said first two named pulleys, said support positioned in engagement with said fluid filled bellows, and means adapted to operate said slidable bracket to bring said second named pulley into proximity to the frame, and place said third pulley under load from the tension of the cable, and indicating means adapted to be operated by pressure in the fluid filled bellows to indicate the tension of said cable or the like.

8. A manual device for measuring the tension of a cable or the like of different diameters, in combination, a frame, a scale on said frame, a pulley mounted on a fixed stud at one end of said frame, a bracket mounted in the other end of said frame and slidable transversely thereof, a pulley mounted in said bracket, a fluid filled bellows, a support carrying a third pulley intermediate said first and second pulley, said support consisting in a flange held in position by a compression spring and in engagement with said bellows, means to operate said slidable bracket to bring said second pulley into proximity to the frame and place said third pulley under load from the tension of the cable, means to indicate the tension of the cable, and a second indicating device co-acting with said scale and movable relative to said frame to indicate the diameter of the cable.

In testimony whereof I affix my signature.

W. DEAN BURTON.